M. BOHLIG.
TENON CUTTER.
APPLICATION FILED JUNE 10, 1912.
1,107,483.
Patented Aug. 18, 1914.
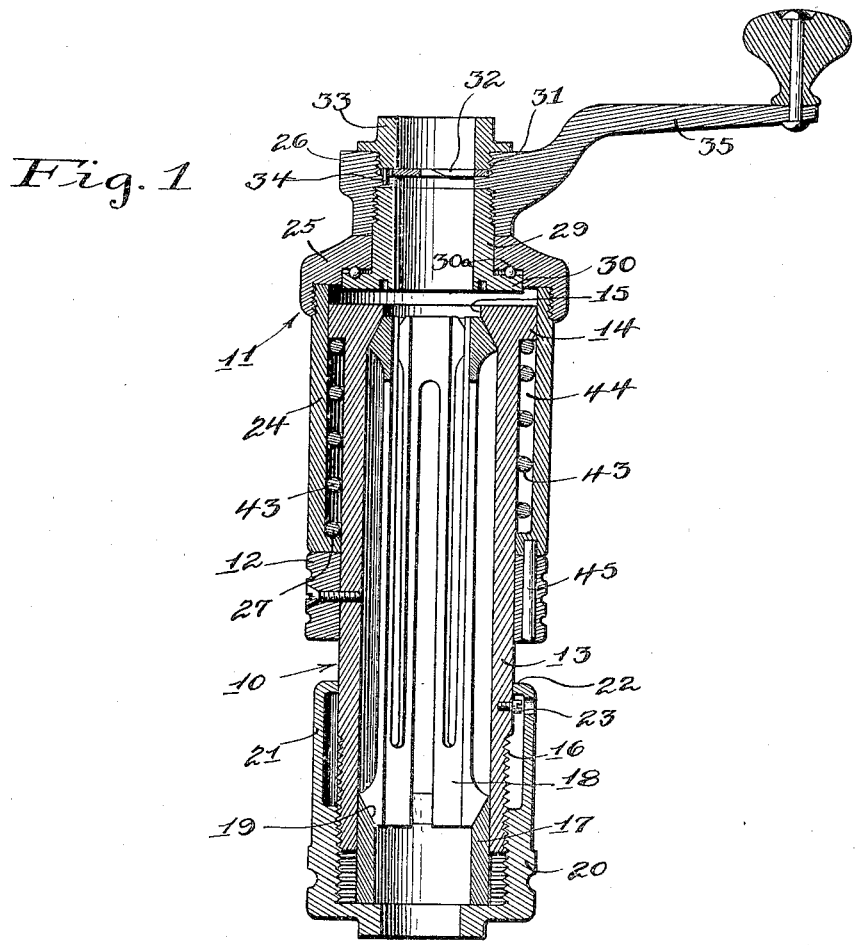
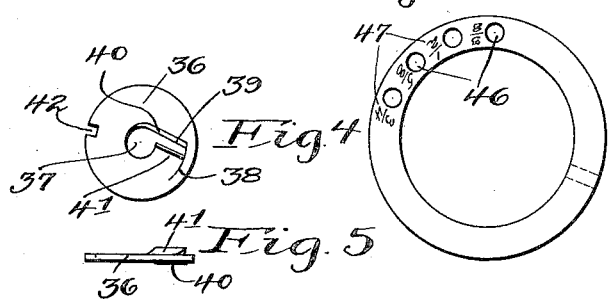
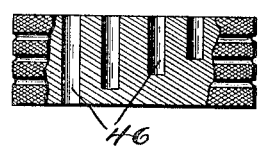
Witnesses
F. C. Caswell
F. M. Hardy
Inventor
Martin Bohlig
by John E. Stryker atty.

UNITED STATES PATENT OFFICE.

MARTIN BOHLIG, OF ST. PAUL, MINNESOTA.

TENON-CUTTER.

1,107,483.  Specification of Letters Patent.  Patented Aug. 18, 1914.

Application filed June 10, 1912. Serial No. 702,736.

*To all whom it may concern:*

Be it known that I, MARTIN BOHLIG, a citizen of the United States, residing at St. Paul, in the county of Ramsey and State of Minnesota, have invented new and useful Improvements in Tenon-Cutters, of which the following is a specification.

My invention relates to improvements in tenon cutters and is particularly, though not exclusively, adapted for cutting tenons on billiard cues and the like. Its object is to provide a simple, durable and compact tenon cutting tool adapted to be quickly applied to the article to be worked upon and designed to firmly fix and accurately center said article within said tool.

A further object is to provide in a tenon cutter means for automatically moving the cutting blade and limiting its working depth.

A further object is to provide in a device of this class a cutting blade simple and inexpensive in construction and designed to be quickly and easily attached to and detached from said device.

In the drawings Figure 1 is a central sectional view of my improved tenon cutting tool; Fig. 2 is a plan view of the adjusting collar; Fig. 3 is an elevation of the same partly broken away; Fig. 4 is a plan view, in detail, of the cutting blade and Fig. 5 is a side elevation of the same.

Referring to the drawing, I have used the reference numeral 10 to indicate the chuck, 11, the head of the tool and 12 the adjusting collar.

The chuck provides means for securing and centering an article to be tenoned and forms a mounting for the head 11, and collar 12. This chuck is constructed as follows: The hollow cylindrical body portion or shank 13 is provided at one end with an annular exterior shoulder 14 and a beveled annular interior shoulder 15, and is formed at its other end with threads 16, adapted to move in the hereinafter mentioned nut 20. The sleeve 17, beveled internally at one end, is slidable within said shank 13. The tubular member 18 is formed with staggered slots alternating from opposite ends of said member and extending nearly its entire length to form a flexible and resilient grip. The ends of said grip 18 are also beveled, one end being designed to b ear against the beveled shoulder 15 of the shank 13 while the other end is arranged to impinge against the beveled portion 19 of the sleeve 17. The nut 20 on the threaded end of the shank 13 engages the sleeve 17 and when said nut is turned on said shank it raises said sleeve and compresses the grip 18 throughout its entire length or permits the return of said sleeve and the expansion of said grip. This nut 20 is provided with an annular shell 21 having a flange 22 thereon adapted to engage the stop screw 23 in the shank 13 and prevent accidental removal of said nut from said shank.

The head 11 of the tool comprises essentially a sleeve 24, cap 25 and cutting blade holder 26. The sleeve 24 is slidable on the shoulder 14 of the shank 13 and is provided at one end with an inwardly projecting flange 27 which forms a bearing for said sleeve on the shank 13. The cap 25 is threaded on the upper end of the sleeve 24 and on this cap the cutting blade holder 26 is revolubly mounted. The mounting is formed by the hollow plug 29 which is threaded in the holder 26 and journaled in the cap 25. This plug is provided at its lower end with a flange 30 separated from the cap 29 by a plurality of ball-bearings 30$^a$, said bearings being adapted to receive the end thrust of the head 11. The cutting blade holder 26 is shaped with a threaded socket 31 adapted to receive the cutting blade 32 and also the nut 33, which, together with the pin 34 in said holder, firmly fix and retain said blade in its proper position. The handle 35 is an extension of the cutting blade holder 26 and furnishes means whereby said holder may be revolved.

The cutting blade 32 comprises a disk 36 having a circular perforation 37 at its center. This disk is cut on a curve 38 near its edge and also on a line 39 tangent to said perforation, said line 39 extending to said curve. A cutting edge 40 is formed on the line 39 and the portion 41 of the disk 36 is curved upward to form a lip to raise the shavings and prevent clogging. A notch 42 is formed in the edge of said blade to receive the pin 34, in the cutting blade holder 26. The diameter of the tenon is determined by the diameter of the perforation 37 and it is evident that each tool may be supplied with a series of cutting blades perforated for different sizes.

Means for automatically moving the cutting blade 32 is provided and comprises a spring 43 arranged within the annular recess 44 formed between the sleeve 24 and shank 13. This spring bears at one end against the shoulder 14 on the shank 13 and at its other end against the flange 27 on the sleeve 24, said spring operates to move the head 11 and with it the cutting blade 32 toward the chuck 10.

It is often desirable to determine accurately the length of the tenon to be cut and to accomplish this end, I have supplied the shank 13 with the collar 12 and the sleeve 24 with the pin 45. The collar 12 is fixed on said shank and is provided with a number of longitudinal openings 46 of different depths, said openings being adapted to receive the pin 45 and permit the movement of the head 11 to various positions relative to the chuck 10. The depths of these openings 46 are indicated at 47 on the surface of the collar 12 and by directing the pin 45 into the proper opening the operator may obtain a tenon of the desired length.

In the practical operation of this tool the head 11 is moved longitudinally on the shank 13 of the chuck, against the action of the spring 43 and is turned slightly so that the end of the pin 45 may rest upon the upper face of the collar 12 and thereby secure said head in elevated position on said chuck. The end of the cue or other object to be tenoned is inserted through the sleeve 17, grip 18 and head 11, to a position adjacent to the cutting blade 32. The nut 20 is then turned on the shank 13 to compress the grip 18, which adjusts itself to the contour of said cue and firmly secures and centers the same within the shank. The head 11 is then turned to position registering the pin 45 with the desired opening 46 in the collar 12. The cutting blade 32 is revolved by turning the handle 35. As this blade forms the tenon it protrudes through the perforation 37 of said blade and as the operation continues the head 11 is moved on the shank 13 by the action of the spring 43 until the pin 45 impinges against the bottom of one of the openings 46; this contact arrests the movement of the head 11 and continued revolution of the cutting blade finishes the shoulder at the base of the tenon.

It is evident from the above description that the tool is adjustable to shape tenons of varying length and that different diameters may be secured by substituting one cutting blade for another.

What I claim as new and desire to secure by Letters Patent, is:

1. In a tenon cutting tool, the combination of a shank, a sleeve slidable on said shank, a cutting blade revolubly supported on said sleeve, a grip within the shank for securing and centering an article to be tenoned, and a spring housed within the sleeve and adapted to automatically move said sleeve on said shank.

2. In a tenon cutting tool, the combination of a shank, a head consisting of a sleeve and cap therefor, said head being slidable on said shank, a cutting blade revolubly mounted on said head, a grip within the shank for securing and centering an article to be tenoned, a spring incased between the head and shank and adapted to move the former upon the latter, and means for discontinuing the movement of said head at various points with respect to said shank whereby tenons of different lengths may be formed.

3. In a tenon cutting tool the combination of a shank, a head slidable on said shank, a cutting blade revolubly mounted on said head, a grip within the shank for securing and centering an article to be tenoned, a spring for moving said head on said shank, a collar on the shank formed with longitudinal openings of different lengths, a pin in said head adapted to register with said openings and limit the movement of said head.

4. In a tenon cutting tool, the combination of a shank, a head slidable on said shank, a cutting blade revoluble upon said head, a grip within the shank for securing and centering an article to be tenoned, a spring adapted to move the head upon the shank and means for positively and automatically discontinuing the movement of said head at various predetermined points with respect to said shank whereby tenons of different lengths may be accurately formed and the shoulders thereof finished.

5. In a tenon cutter, the combination of a shank, a grip within the shank for securing and centering an article to be tenoned, a head slidable and revoluble on said shank, a cutting blade revolubly mounted on said head and means to stop the longitudinal movement of the head at various positions, said positions being predetermined by lateral adjustment of said head.

6. In a tenon cutting tool the combination of a shank, a head consisting of a sleeve slidable on said shank, a cap on one end of said sleeve and a holder revoluble on said cap, a cutting blade removably secured in said holder and a grip within the shank for securing an article and centering the same within said shank.

7. In a tenon cutting tool the combination of a shank, a head consisting of a sleeve slidable on said shank, a cap on one end of said sleeve and a holder revoluble on said cap, a cutting blade removably secured in said holder, a grip for securing an article and centering the same within the shank, and a spring bearing at one end against said shank and at the other against said sleeve for moving the head on said shank.

8. In a tenon cutter, the combination of a chuck comprising a shank, and a grip within the shank for securing and centering an article to be tenoned, a head slidable and revoluble on said shank, a cutting blade on said head and a stop on the shank having engaging means at different degrees of remoteness from said head, adapted to limit the movement thereof to various points with respect to the shank.

9. In a tenon cutter, the combination of a chuck comprising a shank, and a grip within the shank for securing and centering an article to be tenoned, a head slidable and revoluble on said shank, a cutting blade on said head, a spring for automatically moving the head upon the shank and a stop on said shank having engaging means at different degrees of remoteness from said head and adapted to limit the movement thereof to various points with respect to the shank.

10. In a tenon cutter, the combination of two hollow, cylindrical members telescopically connected, a grip within the inner member adapted to secure and center an object therein and a revoluble cutting device centrally arranged upon the outer member.

11. In a tenon cutter, the combination of two hollow, cylindrical members telescopically connected, a grip within the inner member adapted to secure and center an object therein, a revoluble cutting device centrally arranged upon the outer member, and a spring incased between said members for moving one upon the other.

In testimony whereof, I have signed my name to this specification in the presence of two subscribing witnesses.

MARTIN BOHLIG.

Witnesses:
 F. C. CASWELL,
 W. H. BOHLIG.

Copies of this patent may be obtained for five cents each, by addressing the "Commissioner of Patents, Washington, D. C."